(12) United States Patent
Shigeo et al.

(10) Patent No.: US 8,895,194 B2
(45) Date of Patent: Nov. 25, 2014

(54) SOLID ELECTROLYTE MATERIAL OF CONDUCTING LITHIUM ION, BATTERY DEVICE USING THE SOLID ELECTROLYTE MATERIAL AND ALL-SOLID LITHIUM SECONDARY BATTERY PROVIDED WITH THE BATTERY DEVICE

(75) Inventors: Kondo Shigeo, Hirakata (JP); Takeuchi Yasumasa, Yokohama (JP); Yuji Shinohara, Kofu (JP); Takeo Kawase, Suwa (JP)

(73) Assignee: Seiko Epson Corporation, Tokyo (JP)

(*) Notice: Subject to any disclaimer, the term of this patent is extended or adjusted under 35 U.S.C. 154(b) by 771 days.

(21) Appl. No.: 12/230,767

(22) Filed: Sep. 4, 2008

(65) Prior Publication Data

US 2009/0087751 A1 Apr. 2, 2009

(30) Foreign Application Priority Data

Sep. 5, 2007 (JP) ................... 2007-230853

(51) Int. Cl.
*H01M 6/18* (2006.01)
*H01M 10/0562* (2010.01)

(52) U.S. Cl.
CPC ........... *H01M 10/0562* (2013.01); *H01M 6/18* (2013.01); *Y02E 60/12* (2013.01); *Y02E 60/122* (2013.01)
USPC ........... 429/320; 429/304; 429/322; 252/62.2

(58) Field of Classification Search
CPC H01M 10/0562; H01M 10/18; Y02E 60/122; Y02E 60/12
USPC ............... 429/320, 304, 322; 252/62.2
See application file for complete search history.

(56) References Cited

U.S. PATENT DOCUMENTS

| | | | |
|---|---|---|---|
| 4,585,714 A | 4/1986 | Akridge | |
| 5,217,826 A | 6/1993 | Yamamura et al. | |
| 7,425,518 B2 | 9/2008 | Yoshida et al. | |
| 7,648,537 B2 | 1/2010 | Harada et al. | |
| 7,674,559 B2 * | 3/2010 | Min et al. | 429/304 |
| 7,901,468 B2 | 3/2011 | Harada et al. | |
| 2007/0248888 A1 | 10/2007 | Seino et al. | |
| 2008/0274411 A1 * | 11/2008 | Nakajima et al. | 429/320 |

FOREIGN PATENT DOCUMENTS

| | | |
|---|---|---|
| CN | 1755975 A | 4/2006 |
| CN | 1965378 A | 5/2007 |
| JP | A-06-279049 | 10/1994 |
| JP | A-06-340446 | 12/1994 |
| JP | A-08-138724 | 5/1996 |

(Continued)

OTHER PUBLICATIONS

Inada et al. "Fabrication and properties of composite solid-state electrolytes", Solid State Ionics (2003), 158 (3,4), pp. 275-280.*

(Continued)

*Primary Examiner* — Laura Weiner
(74) *Attorney, Agent, or Firm* — Oliff PLC

(57) ABSTRACT

A solid electrolyte material of conducting a lithium ion comprises a sulfide-based lithium-ion conductor and α-alumina. Such a solid electrolyte material exhibits superior lithium-ion conductivity. Further, a battery device provided with such a solid electrolyte material is also provided. Furthermore, an all-solid lithium-ion secondary battery provided with such a battery device is also provided.

6 Claims, 10 Drawing Sheets

Battery device of present invention

(56) References Cited

FOREIGN PATENT DOCUMENTS

| JP | 10-3818 | * | 1/1998 |
|---|---|---|---|
| JP | A-10-289617 | | 10/1998 |
| JP | A-10-334731 | | 12/1998 |
| JP | A-11-73992 | | 3/1999 |
| JP | A-2004-152659 | | 5/2004 |
| JP | A-2004-250276 | | 9/2004 |
| JP | A-2006-244734 | | 9/2006 |
| WO | WO 2005/112180 A1 | | 11/2005 |

OTHER PUBLICATIONS

Liang, "Conduction Characteristics of the Lithium Iodide-Aluminium Oxide Solid Electrolytes", Journal of the Electrochemcial Society, *Electrochemical Science and Technology*, Oct. 1973, pp. 1289-1292.

S.D. Jhones et al; "A Thin-Film Solid-State Microbattery"; *J. Power Sources,* pp. 43-44, 505-513 (1993).

Office Action dated May 10, 2013 issued in U.S. Appl. No. 12/327,343.

U.S. Office Action dated May 25, 2012 for U.S. Appl. No. 12/327,343.

Aug. 18, 2011 Office Action issued in U.S. Appl. No. 12/327,343.

Office Action dated Oct. 26, 2012 from U.S. Appl. No. 12/327,343.

Office Action dated Aug. 2, 2013 issued in U.S. Appl. No. 12/327,343.

Dec. 30, 2011 Office Action issued in U.S. Appl. No. 12/327,343.

\* cited by examiner

Battery device of present invention

Electrodes used in battery device of present invention

Terminal electrode

Terminal electrode

Schematic view of mold for producing battery device (electrodes)

Conventional battery device

Vertical section view of all-solid lithium secondary battery of conventional type Mold for producing electrodes of present invention All-solid lithium-ion secondary battery
of present invention

SOLID ELECTROLYTE MATERIAL OF CONDUCTING LITHIUM ION, BATTERY DEVICE USING THE SOLID ELECTROLYTE MATERIAL AND ALL-SOLID LITHIUM SECONDARY BATTERY PROVIDED WITH THE BATTERY DEVICE

CROSS-REFERENCE TO RELATED APPLICATION

This application claims a priority to Japanese Patent Application No. 2007-230853 filed on Sep. 5, 2007 which is hereby expressly incorporated by reference herein in its entirety.

TECHNICAL FIELD

The present invention relates to a solid electrolyte of conducting a lithium ion, a battery device and an all-solid lithium secondary battery, more particularly, to a solid electrolyte of conducting a lithium ion, a battery device using such a solid electrolyte and an all-solid lithium-ion secondary battery provided with such a battery device.

RELATED ART

Along with development of portable equipment such as a personal computer and a cellular phone, demand for a small-sized lightweight secondary battery as a power source of the portable equipment shows a drastic increase in recent years.

Among secondary batteries, in particular, it is predicted that a lithium secondary battery realizes a high energy density since lithium has a reduced atomic weight and increased ionization energy. Extensive research has been made in this respect, as a result of which the lithium battery is widely used as a power source of the portable equipment and the like these days.

Expansion of a lithium battery market demands a lithium battery having a higher energy density. In order to comply with such a demand, internal energy of the lithium battery has been made greater by increasing the quantity of an active material contained in the battery.

Concomitant with this trend, a noticeable increase has been made in the quantity of organic solvent contained in an electrolyte (electrolytic solution) which is a flammable material filled in the battery. This results in an increased danger of battery firing and, therefore, the problem of battery safety becomes at issue in recent years.

One of highly effective methods for assuring the safety of a lithium battery is to replace an electrolyte containing organic solvent with a nonflammable solid electrolyte. Among others, use of an inorganic solid electrolyte of conducting a lithium ion makes it possible to develop an all-solid lithium battery that exhibits improved safety. Active research is now being made in this connection.

As an example, S. D. Jhones and J. R. Akridge, J. Power Sources, 43-44, 505 (1993) discloses an all-solid thin film lithium secondary battery produced by sequentially forming a cathode thin film, an electrolyte thin film and an anode thin film through the use of a deposition apparatus or a sputtering apparatus. It is reported that the thin film lithium secondary battery exhibits superior charge-discharge cycle characteristics of several thousand cycles or more.

With this thin film lithium secondary battery, however, it is impossible for a battery element to retain an electrode active material in a large quantity, thereby making it difficult to obtain a high capacity battery. In order to increase the battery capacity, a great quantity of electrode active materials should be contained in an electrode.

Further, in such a thin film lithium secondary battery, an ion-conducting path and an electron-conducting path thereof should be ensured. Therefore, there is a need to construct a bulk type battery having a large battery capacity by using electrodes constituted of an electrode mixture material which includes a solid electrolyte material and an electrode active material.

Generally, a bulk type battery is produced by a press machine as follows. First, a cathode mixture material containing a cathode active material and a solid electrolyte material as an electrode material is filled into a mold of the press machine. Next, the cathode mixture material is pressure-molded by the press machine to obtain a cathode. Likewise, an anode is obtained in the same manner as the cathode by using another mold. A solid electrolyte material is filled into the mold so as to laminate on the cathode.

Then, the filled electrolyte material is pressure-molded by the press machine to obtain a solid electrolyte layer. Thereafter, the produced anode is placed on the solid electrolyte layer provided in the mold. Then, the anode, the solid electrolyte layer and the cathode are pressure-molded in the mold by the press machine to obtain a battery device. The thus obtained battery device is placed into a battery container of a coin type to obtain an all-solid lithium secondary battery.

Such a battery device includes the anode containing an anode active material, the solid electrolyte layer containing the solid electrolyte material and the cathode containing the cathode active material. The battery device is produced by laminating the anode, the solid electrolyte layer and the cathode in this order. The all-solid lithium secondary battery includes the battery device produced as described above. JP A-2006-244734 discloses an example of such an all-solid lithium secondary battery.

Likewise, electrodes (cathode and anode) and a solid electrolyte layer are produced by using a solid electrolyte powder (material) of conducting a lithium ion, and thereafter an all-solid lithium secondary battery is produced by molding the electrodes and the solid electrolyte layer. However, since the used solid electrolyte material is very brittle and hard, it is very difficult to reliably produce electrodes each having a good shape and a large surface area.

Therefore, it has been contemplated that an organic polymer binder is used for producing electrodes and a solid electrolyte layer in order to solve problems such as molding property of the electrodes. Further, it has been researched whether a secondary battery having high molding property can be produced or not by adding the organic polymer binder to the electrode mixture material and the solid electrolyte material.

In this regard, if the organic polymer binder (of which amount is in the range of a few percent to dozens percent with respect to an amount of the solid electrolyte material) is added to the solid electrolyte material to obtain a sheet-like electrolyte, ion conductivity of the sheet-like electrolyte is lower about one-digit as compared to ion conductivity of an solid electrolyte material containing no organic polymer binder.

Therefore, development of a solid electrolyte having superior characteristics of conducting a lithium ion is desired. In the solid electrolyte of conducting the lithium ion used for such a purpose, it is required that the solid electrolyte has high decomposition voltage and superior lithium-ion conductivity.

Such a solid electrolyte of conducting the lithium ion includes various materials such as an oxide-based material, a sulfide-based material, lithium nitride and lithium halide, and the like. As a method for improving lithium ion conductivity of these materials, there is a method that oxygen atoms contained in the oxide-based material are substituted to sulfide atoms having a weak electron affinity to obtain a sulfide-based solid electrolyte having superior lithium-ion conductivity.

TABLE 1

Ion conductivity of various of lithium ion conductors

| Various of lithium ion conductors | Ion conductivity (S/cm) |
|---|---|
| $Li_2O$—$SiO_2$ | $5.3 \times 10^{-5}$ (at 300° C.) |
| $Li_2O$—$SiO_2$—$Li_2SO_4$ | $2.2 \times 10^{-3}$ (at 300° C.) |
| $Li_2O$—$P_2O_5$—LiI | $3 \times 10^{-6}$ (at 25° C.) |
| $Li_2O$—$P_2O_5$—LiBr | $1\sim3 \times 10^{-6}$ (at 25° C.) |
| $Li_2O$—$P_2O_5$—LiCl | $4.8 \times 10^{-7}$ (at 25° C.) |
| $Li_2O$—$B_2O_3$—LiI | $3.2 \times 10^{-3}$ (at 300° C.) |
| $Li_2O$—$B_2O_3$—LiBr | $1.0 \times 10^{-3}$ (at 300° C.) |
| $Li_2O$—$B_2O_3$—LiCl | $1.3 \times 10^{-3}$ (at 300° C.) |
| $Li_2S$—$SiS_2$ | $5 \times 10^{-4}$ (at 25° C.) |
| $Li_2S$—$SiS_2$—LiI | $2 \times 10^{-3}$ (at 25° C.) |
| $Li_2S$—$SiS_2$—LiBr | $3 \times 10^{-4}$ (at 25° C.) |
| $Li_2S$—$B_2S_3$ | $1 \times 10^{-4}$ (at 25° C.) |
| $Li_2S$—$B_2S_3$—LiI | $1 \times 10^{-3}$ (at 25° C.) |
| $Li_2S$—$P_2S_5$ | $1 \times 10^{-4}$ (at 25° C.) |
| $Li_2S$—$P_2S_5$—LiI | $1 \times 10^{-3}$ (at 25° C.) |
| $Li_2S$—$GeS_2$ | $1 \times 10^{-4}$ (at 25° C.) |

Table 1 shows lithium-ion conductivities of various lithium ion conductors which are obtained by substituting oxygen atoms contained in various oxide-based materials to sulfide atoms. As shown in Table 1, the sulfide-based lithium ion conductors obtained by substituting the oxygen atoms contained in the oxide-based materials to the sulfide atoms have high lithium-ion conductivity. For example, the sulfide-based lithium ion conductor containing lithium sulfide and lithium silicone has lithium-ion conductivity of about $2\times10^{-3}$ S/cm which is ion conductivity of an organic electrolyte.

Further, another lithium ion conductor, for example, lithium iodide (LiI) generally has low lithium-ion conductivity of about $10^{-7}$ S/cm at room temperature. Therefore, C. C. Liang (J. Electrochem. Soc., 120 No. 10 1289 (1973)) discloses that a lithium ion conducting glass produced by adding alumina ($\gamma$-$Al_2O_3$) used in a column chromatography to such lithium iodide improves the lithium-ion conductivity thereof. That is, alumina in the range of 35 to 60% with respect to lithium iodide is added to lithium iodide to obtain the lithium ion conducting glass of which lithium-ion conductivity is about $1\times10^{-5}$ S/cm.

According to the disclosure of C. C. Liang, first, $\gamma$-$Al_2O_3$ having insulating property in the range of 35 to 60% with respect to lithium iodide is added to lithium iodide (LiI) of an electrolyte material (lithium ion conductor) to obtain a mixture. Next, the mixture is heat-melted at a temperature of 550° C. for 17 hours in helium. Thereafter, the melted mixture is cooled and ground, and then lithium-ion conductivity of the ground mixture is measured.

As a result, despite the fact that $\gamma$-$Al_2O_3$ having insulating property is added, maximum lithium-ion conductivity is obtained in the mixture produced by adding $\gamma$-$Al_2O_3$ of 45% with respect to lithium iodide to lithium iodide. In this regard, it is to be noted that C. C. Liang discloses that the $\gamma$-$Al_2O_3$ is not melted during the melting process (alumina does not melt at such a temperature.).

The improvement of the lithium-ion conductivity is because good ion-conducting paths are formed in an interfacial surface between LiI and $\gamma$-$Al_2O_3$ which is obtained by mixing lithium iodide and $\gamma$-alumina (insulating powder). However, detailed cause is unclear.

SUMMARY

In order to develop a solid electrolyte material of conducting a lithium ion having superior lithium-ion conductivity, the present inventors have studied the solid electrolyte material by reference to the disclosure of C. C. Liang. That is to say, the present inventors have studied under the expectation that a new lithium-ion conducting path may be formed in an interfacial surface between the solid electrolyte material and other fine particles having insulating property in a mixture obtained by adding the fine particles to a sulfide-based solid electrolyte material of conducting a lithium ion. For this purpose, various kinds of fine particles having insulating property have been examined.

As a result, the present inventors have found that only specific fine particles having insulating property among the examined various fine particles ($SiO_2$, $ZrO_2$, $\alpha$-$Al_2O_3$, $\beta$-$Al_2O_3$, $\gamma$-$Al_2O_3$) have an effect of improving lithium-ion conductivity. Further, the present inventors have also found that a mixture of the specific fine particles and the solid electrolyte material is not a mere mixture but is a new sulfide-based solid electrolyte material of conducting a lithium ion which has new property.

Accordingly, it is a first object of the present invention to provide the new solid electrolyte material of conducting a lithium ion having superior lithium ion conductivity. Further, it is also a second object of the present invention to provide a battery device in which such a new solid electrolyte material is provided between a cathode and an anode. Furthermore, it is also a third object of the present invention to provide an all-solid secondary battery provided with such a battery device.

These objects are achieved by the present invention described below.

In a first aspect of the present invention, there is provided a solid electrolyte material of conducting a lithium ion, comprising a sulfide-based lithium-ion conductor and $\alpha$-alumina.

The solid electrolyte material of conducting a lithium ion has superior lithium-ion conductivity due to a lithium-ion conducting path obtained by mixing the sulfide-based lithium-ion conductor and $\alpha$-alumina.

In the solid electrolyte according to the present invention, it is preferred that an amount of $\alpha$-alumina contained in the electrolyte material is in the range of 1 to 20 wt % at a ratio by weight to the sulfide-based lithium-ion conductor.

This solid electrolyte material has superior lithium-ion conductivity due to an appropriate amount of $\alpha$-alumina.

In the solid electrolyte according to the present invention, it is also preferred that the sulfide-based lithium-ion conductor is constituted of a crystalline material, an amorphous material or a mixture material of the crystalline material and the amorphous material.

The sulfide-based lithium-ion conductor has many movable lithium ions. Therefore, an ion-conducting path is produced in an interfacial surface between the sulfide-based lithium-ion conductor and the $\alpha$-alumina (fine particles of the $\alpha$-alumina) due to movement of the movable lithium ions. As a result, it is possible to obtain superior lithium-ion conductivity.

In the solid electrolyte according to the present invention, it is also preferred that the sulfide-based lithium-ion conductor contains a semiconductor as a component thereof.

Such a sulfide-based lithium-ion conductor has superior lithium-ion conductivity by itself. Therefore, inclusion of the semiconductor to the sulfide-based lithium-ion conductor exhibits more superior lithium-ion conductivity. For this reason, the sulfide-based lithium-ion conductor containing the semiconductor is reliably used as the solid electrolyte material of the present invention.

In the solid electrolyte according to the present invention, it is also preferred that the sulfide-based lithium-ion conductor contains lithium sulfide ($Li_2S$), silicone sulfide ($SiS_2$), and lithium phosphate ($Li_3PO_4$).

Since the sulfide-based lithium-ion conductor is constituted of the amorphous material, a lithium-ion conducting path existing in the solid electrolyte material has no anisotropy. Therefore, the solid electrolyte material constituted of such an amorphous material can be preferably used as a solid electrolyte material for producing electrodes for an all-solid lithium secondary battery, for example.

In the solid electrolyte according to the present invention, it is also preferred that the solid electrolyte further comprises an organic binder constituted of a resin material as a main constituent material thereof.

This makes it possible to maintain the same lithium-ion conductivity as that of a solid electrolyte material of conducting a lithium ion containing no α-alumina. Additionally, it is also possible to improve strength of electrodes and a solid electrolyte which are produced by using the solid electrolyte material containing the organic binder.

In the solid electrolyte according to the present invention, it is also preferred that the resin material comprises at least one of a styrene block copolymer, polyolefin, polyamide, polyimide and a hot-melt resin as a main component thereof.

This makes it possible to prevent lithium-ion conductivity of the solid electrolyte material containing such an organic binder from being low. Therefore, it is possible to improve strength of electrodes and a solid electrolyte which are produced by using the solid electrolyte material containing such an organic binder.

In a second aspect of the present invention, there is provided a battery device which comprises a pair of electrodes and an electrolyte layer provided between the pair of electrodes, wherein the solid electrolyte material of conducting a lithium ion as described above is contained in the electrolyte layer.

By providing the such a solid electrolyte material between the cathode and the anode, it is possible to provide a battery device having superior charge-discharge characteristics.

In a third aspect of the present invention, there is provided an all-solid lithium secondary battery provided with the battery device described above.

By including such a battery device, it is possible to provide an all-solid lithium secondary battery having superior charge-discharge characteristics.

BRIEF DESCRIPTION OF THE DRAWINGS

FIGS. 2-1 and 2-2 are vertical section views which show electrodes used in a battery device in accordance with the present invention.

DESCRIPTION OF EXEMPLARY EMBODIMENTS

Figure 1:
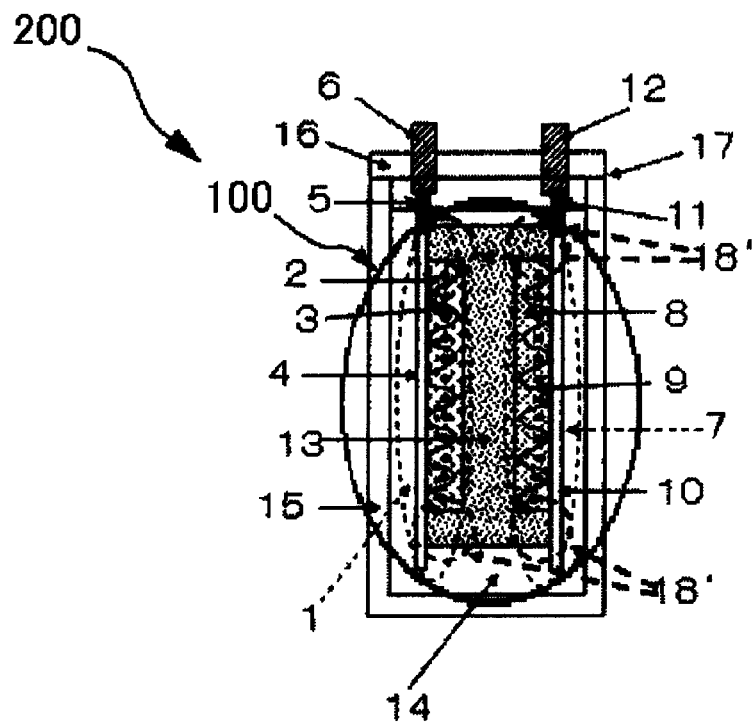
FIG. 1 is a vertical section view which shows an all-solid lithium secondary battery in accordance with an embodiment of the present invention.

Hereinbelow, a new solid electrolyte material of conducting a lithium ion and an all-solid lithium secondary battery according to the present invention will be described in detail with reference to preferred embodiments shown in the accompanying drawings.

First, a new solid electrolyte material of conducting a lithium ion according to the present invention will be described in detail.

Solid Electrolyte Material of Conducting Lithium Ion

The new solid electrolyte material of conducting the lithium ion (hereinafter, simply referred to as "solid electrolyte material") according to the present invention contains a sulfide-based lithium-ion conductor.

Examples of the sulfide-based lithium-ion conductor to be used in the solid electrolyte material include: a glass of conducting a lithium ion such as $Li_2S$—$SiS_2$, $Li_2S$—$SiS_2$—$LiI$, $Li_2S$—$SiS_2$—$LiBr$, $Li_2S$—$SiS_2$—$LiCl$, $Li_2S$—$SiS_2$—$B_2S_3$—$LiI$, $Li_2S$—$SiS_2$—$P_2S_5$—$LiI$, $Li_2S$—$B_2S_3$, $Li_2S$—$P_2S_5$, $Li_2S$—$P_2S_5$—$LiI$, $Li_2S$—$P_2S_5$—$Z_mS_n$ ($Z$=Ge, Zn, Ga) (the "m" and "n"=represent integers except 0), $Li_2S$-$GeS_2$, $Li_2S$—$SiS_2$—$Li_3PO_4$; a crystalline material of conducting a lithium ion containing these glasses; a material of conducting a lithium ion which constituted of a mixture of these glasses and crystalline material; and the like.

α-alumina ($Al_2O_3$) having a particle size of 10 μm or less is used as insulating fine particles which are added to the sulfide-based lithium-ion conductor. The α-alumina is heated at a temperature of 250° C. for 5 hours under a high vacuum atmosphere to remove moisture which is likely to adhere to the surface thereof (preparation step).

A predetermined amount of the α-alumina is weighed, and the α-alumina is mixed with the sulfide-based lithium-ion conductor to obtain a solid electrolyte material. Then, the sulfide-based lithium-ion conductor and the α-alumina contained in the solid electrolyte material are finely ground by using a planetary ball mill (preparation step). A pot of the used planetary ball mill is made of alumina. Balls used in the pot are also made of alumina. In this regard, diameters of the balls are 5 mm and 10 mm.

The preparation steps described above is carried out in a dry box under dry argon atmosphere. Next, a disc-like solid electrolyte is produced by using a mold having a cylindrical hole of which diameter is 1 cm. That is, the solid electrolyte material is filled into the cylindrical hole of the mold. Then, the filled solid electrolyte material is pressed at a pressure of 5 ton by the mold to obtain a disc-like solid electrolyte. A diameter of the thus produced disc-like solid electrolyte is 1 cm and a thickness thereof is 3 mm. The disc-like solid electrolyte is taken out from the cylindrical hole of the mold.

On the other hand, two stainless plates of which diameters are 1.0 cm are prepared as electrodes for measuring lithium-ion conductivity. Then, the produced disc-like solid electrolyte is provided between the two stainless plates, which are pressed at a pressure of 5 ton to obtain a cell for measuring lithium-ion conductivity. Thereafter, the cell is placed into a cylindrical tube having insulating property which is used for measuring conductivity. In this state, lithium-ion conductivity of the solid electrolyte is measured. In this regard, it is to be noted that the cylindrical tube has a diameter of 1.03 cm and is made of alumina.

Hereinbelow, description will be made with regard to experimental examples of the present invention in order to describe in detail the solid electrolyte material according to the present invention.

Example 1

First, a lithium-ion conducting glass constituted of $Li_2S$—$SiS_2$—$Li_3PO_4$ is used as a sulfide-based lithium-ion conductor which is a starting material of a solid electrolyte material. Further, α-alumina is used as insulating fine particles. Then, the solid electrolyte materials are produced by mixing the lithium-ion conducting glass and the α-alumina at various ratios by weight according to the method described above. Then, in each of the solid electrolyte materials, lithium-ion conductivity is measured by using a predetermined method.

Comparative Example 1

In order to examine the effects of the present invention, a lithium-ion conducting glass constituted of $Li_2S$—$SiS_2$—$Li_3PO_4$ is used as a sulfide-based lithium-ion conductor which is a starting material of a solid electrolyte material. Further, $SiO_2$ having a particle size of 5 μm is used as insulating fine particles. Then, the solid electrolyte material is produced by mixing the lithium-ion conducting glass and $SiO_2$ of 5% at a ratio by weight to the lithium-ion conducting glass according to the method described above.

Comparative Example 2

In order to examine the effects of the present invention, a lithium-ion conducting glass constituted of $Li_2S$—$SiS_2$—$Li_3PO_4$ is used as a sulfide-based lithium-ion conductor which is a starting material of a solid electrolyte material. Further, $ZrO_3$ having a particle size of 5 μm is used as insulating fine particles. Then, the solid electrolyte material is produced by mixing the lithium-ion conducting glass and $ZrO_3$ of 5% at a ratio by weight to the lithium-ion conducting glass according to the method described above.

Then, lithium-ion conductivities of the produced solid electrolyte material and the starting material are measured by using a predetermined method.

Comparative Example 3

In order to examine the effects of the present invention, a lithium-ion conducting glass constituted of $Li_2S$—$SiS_2$—$Li_3PO_4$ is used as a sulfide-based lithium-ion conductor which is a starting material of a solid electrolyte material. Further, β-$Al_2O_3$ having a particle size of 5 μm is used as insulating fine particles. Then, the solid electrolyte material is produced by mixing the lithium-ion conducting glass and β-$Al_2O_3$ of 5% at a ratio by weight to the lithium-ion conducting glass according to the method described above.

Then, lithium-ion conductivities of the produced solid electrolyte material and the starting material are measured by using a predetermined method.

Comparative Example 4

In order to examine the effects of the present invention, a lithium-ion conducting glass constituted of $Li_2S$—$SiS_2$—$Li_3PO_4$ is used as a sulfide-based lithium-ion conductor which is a starting material of a solid electrolyte material. Further, δ-$Al_2O_3$ having a particle size of 5 μm is used as insulating fine particles. Then, the solid electrolyte material is produced by mixing the lithium-ion conducting glass and δ-$Al_2O_3$ of 5% at a ratio by weight to the lithium-ion conducting glass according to the method described above.

Then, lithium-ion conductivities of the produced solid electrolyte material and the starting material are measured by using a predetermined method.

Example 2

First, a crystalline material of conducting a lithium ion, which is constituted of $Li_2S$—$GeS_2$—$P_2S_5$, is used as a sulfide-based lithium-ion conductor which is a starting material of a solid electrolyte material. Further, α-alumina is used as insulating fine particles. Then, the solid electrolyte material is produced by mixing the crystalline material and α-alumina of 5% at a ratio by weight to the crystalline material according to the method described above.

Then, lithium-ion conductivities of the produced solid electrolyte material and the starting material are measured by using a predetermined method.

Example 3

First, a lithium-ion conducting glass constituted of $Li_2S$—$P_2S_5$ is used as a sulfide-based lithium-ion conductor which is a starting material of a solid electrolyte material. Further, α-alumina is used as insulating fine particles. Then, the solid electrolyte material is produced by mixing the lithium-ion conducting glass and α-alumina of 5% at a ratio by weight to the lithium-ion conducting glass according to the method described above.

Then, lithium-ion conductivities of the produced solid electrolyte material and the starting material are measured by using a predetermined method.

Example 4

First, a lithium-ion conducting glass constituted of $Li_2S$—$P_2S_5$—$LiI$ is used as a sulfide-based lithium-ion conductor which is a starting material of a solid electrolyte material. Further, α-alumina is used as insulating fine particles. Then, the solid electrolyte material is produced by mixing the lithium-ion conducting glass and α-alumina of 5% at a ratio by weight to the lithium-ion conducting glass according to the method described above.

Then, lithium-ion conductivities of the produced solid electrolyte material and the starting material are measured by using a predetermined method.

All-Solid Lithium Secondary Battery

Hereinbelow, a battery device provided with a solid electrolyte material according to the present invention will be described in detail. Further, an all-solid lithium secondary battery provided with such a battery device will also be described in detail.

First, the battery device provided with the solid electrolyte material and the all-solid lithium secondary battery provided with such a battery device according to the present invention will be described in detail with reference to preferred embodiments shown in the accompanying drawings.

FIG. 1 is a vertical section view which shows an all-solid lithium secondary battery in accordance with an embodiment of the present invention.

An all-solid lithium secondary battery 200 shown in FIG. 1 includes a battery container 15, a battery device 100 placed in the battery container 15 and an upper lid 16 for sealing the inside of the battery container 15 which is provided on the battery container 15.

The battery device 100 includes a cathode lead board 4, an anode lead board 10 facing the cathode lead board 4, a cathode 1 formed on the surface of the cathode lead board 4, an anode 7 formed on the surface of the anode lead board 10, and a solid electrolyte 13 of conducting a lithium ion (hereinafter, simply referred to as "electrolyte 13") provided in a spacing defined between the surface of the cathode lead board 4 and the surface of the anode lead board 10.

Further, the electrolyte 13 is provided in contact with both surfaces of the cathode lead board 4 and the anode lead board 10 so as to cover both the cathode 1 and the anode 7. Additionally, the electrolyte 13 does not run out of areas of the both surfaces of the cathode lead board 4 and the anode lead board 10 in the spacing.

Further, the all-solid lithium secondary battery 200 also includes a fixed portion 14 provided in the battery container 15 so as to cover the whole battery device 100, a cathode end terminal 6 and an anode end terminal 12 which are provided on the upper lid 16, a cathode connection lead 5 connected between the cathode end terminal 6 and the cathode lead board 4, and an anode connection lead 11 connected between the anode end terminal 12 and the anode lead board 10.

Hereinbelow, description will be made with regard to the battery device 100 having the cathode 1, the anode 7 and the electrolyte 13. Seeing that the cathode 3 and the anode 7 have the same configuration in the present embodiment, the description will be made with regard to the cathode 3, as a representative.

The cathode 1 is formed from a collector 3 and an electrode (cathode) mixture material 2 filled in or coated on the collector 3. The cathode mixture material 2 is constituted of a mixture obtained by mixing an electrode (cathode) active material, a solid electrolyte material (powder), if needed, and a conductive agent such as a carbon as an electrode material. The collector 3 is formed from a mesh member, such as a conductive mesh member having through holes.

For the purpose of obtaining low internal resistance of the cathode 1 and equalization of current flowing in the cathode 1, the collector 3 has functions of providing electronic conductivity as well as reinforcement effect to an expansion or contraction phenomenon of the electrodes which may occur during charge and discharge of the electrodes. Therefore, it is preferred that the cathode 1 is fixed to the cathode lead board 4 and is connected thereto electrically.

Examples of a constituent material that can be used as the collector 3 and the cathode lead board 4 include: an electron-conducting metallic material such as copper (Cu), nickel (Ni), titanium (Ti) and stainless steel (SUS); and an insulating material such as a hard resin material which includes polycarbonate and ceramics which includes alumina and glass. In the case where the insulating material is used in the collector 3 or the cathode lead board 4, it is preferred that a conductive thin film is formed on the surface of the collector 3 or the cathode lead board 4.

In the case where the mesh member is used as the collector 3, the occupation percentage of the through-holes of the collector 3 in a plan view is preferably in the range of about 25 to 90% and more preferably in the range of about 70 to 0.85%, although it may slightly vary depending on the constituent material thereof and intended use of the collector 3.

Further, the collector 3 has an average thickness of preferably about 10 to 400 μm and more preferably about 50 to 300 μm.

In the cathode 1 of the present embodiment, the cathode mixture material 2 is filled into the mesh structure of the collector 3 so as to cover the entire surface of the collector 3.

A thickness of the used cathode lead board 4 is in the range of about 300 to 500 μm.

As the cathode mixture material 2, an cathode active material or a mixture of the cathode active material and a solid electrolyte material (an electrode mixture material) may be used. If needed, the mixture may be further mixed with a conductive agent such as carbon.

By using the mixture of the cathode active material and the solid electrolyte material as the cathode mixture material 2, it becomes possible to increase the ion-conducting bonding interface between particles of the cathode active material and particles of the solid electrolyte material which constitute the cathode 1 (electrode), and also to increase the interface bonding force (adhesion) between the cathode 1 and the electrolyte 13.

This ensures that ions are smoothly transferred between each of the electrodes (1, 7) and the electrolyte 13, which makes it possible to improve the characteristics (charge-discharge characteristics) of the all-solid lithium-ion secondary battery 200.

Examples of the cathode active material that can be used in the present invention include: a transition metal oxide material such as lithium cobaltate ($Li_xCoO_2$), lithium nickelate ($Li_xNiO_2$), lithium nickel cobaltate ($LiCo_{0.3}Ni_{0.7}O_2$), lithium manganate ($LiMn_2O_4$), lithium titanate ($Li_{4/3}Ti_{5/3}O_4$), lithium manganate compound ($LiM_yMn_{2-y}O_4$, where the M is Cr, Co or Ni), lithium iron phosphate and olivine compound, which is one kind of lithium iron phosphate compound ($Li_{1-x}FePO_4$ and $Li_{1-x}Fe_{0.5}Mn_{0.5}PO_4$); sulfide-based chalcogen compound such as $TiS_2$, $VS_2$, FeS and $M.MoS_8$ (where the M is a transition metal such as Li, Ti, Cu, Sb, Sn, Pb and Ni); and a lithium metal oxide containing a metal oxide as its skeleton, such as $TiO_2$, $Cr_3O_8$, $V_2O_5$, $MnO_2$ and $CoO_2$.

On the other hand, examples of an anode active material include: a metallic material such as lithium, indium, aluminum; an alloy produced from these metallic materials and lithium; and the like. These materials may be used singly or in combination of one or more of them.

In case of using the mixture of the cathode active material and the solid electrolyte material, the solid electrolyte material may either be the same kind as (identical to) or differ from a constituent material of the electrolyte 13 (solid electrolyte material of the present invention) set forth below.

However, it is preferred that the solid electrolyte material is the same kind as (especially, identical to) the constituent material of the electrolyte 13. This assures smooth transfer of metal ions between the cathode 1 (electrode) and the electrolyte 13 and also helps to improve adhesion between them.

In this case, a mixing ratio of the cathode active material and the solid electrolyte material is preferably in the range of about 4:6 to 9:1 by weight and more preferably in the rage of about 5:5 to 8:2 by weight, although the mixing ratio is not particularly limited thereto.

As the cathode active material, it is desirable to use a granular (powdery) material having a particle size of 20 micron or less. Use of such a granular material makes it possible to fill the cathode mixture material 2 in the through-holes of the collector 3 in an easy and reliable manner.

An average thickness of the cathode 1 is in the range of 30 to 500 µm, more preferably in the range of 50 to 500 µm, and even more preferably in the range of 50 to 300 µm. If the average thickness of the cathode 1 is smaller than 30 µm, network paths in which electrons conduct to the cathode active material contained in the cathode 1 are reduced, thereby reducing output current.

If the average thickness of the cathode 1 is larger than 500 µm, ion-conducting paths from the cathode 1 to the electrolyte 13 through an interface between the electrolyte 13 and the cathode 1 become long. As a result, internal resistance of the cathode 1 becomes large whereas output current from the battery becomes small. Therefore, in order to obtain high charge-discharge performance of the all-solid lithium-ion secondary battery 200, the optimal thickness of the cathode 1 should lie within the range described above.

It is to be noted that the above descriptions of the cathode 1, the cathode lead board 7, the collector 3, the cathode active material and the cathode mixture material 2 can be applied to the anode 7, the anode lead board 10, an collector 9, the anode active material and an anode mixture material 8 in the present embodiment, respectively.

Next, description will be made with regard to other configuration examples of the cathode 1 with the cathode lead board 4 and the anode 7 with the anode lead board 10, namely terminal electrodes with lead boards. Hereinafter, it is to be noted that an electrode active material includes the cathode active material and the anode active material and an electrode mixture material includes the cathode mixture material 2 and the anode mixture material 8.

Figures 1, 2:
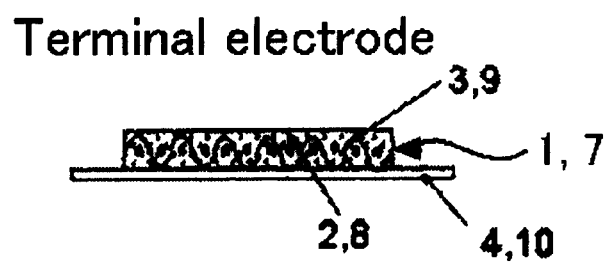
Figure 2:
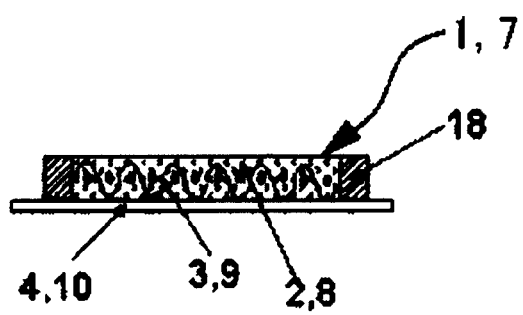

Electrodes shown in FIG. 2-1 and FIG. 2-2 are terminal electrodes of the battery device 100. These terminal electrodes are applied to the cathode 1 and the anode 7. In FIG. 2-1 and FIG. 2-2, the cathode active material 2 is filled into the collector 3 and the anode active material 8 is filled into the collector 9.

The collector 3 is connected with the cathode lead board 4 electrically and the collector 9 is connected with the anode lead board 10 electrically. A mesh member having electron conducting property may be used as the collectors 3 and 9.

Alternatively, instead of the mesh member used in each of the collectors 3, 9, a plate member having electron conductive property and having a surface formed with irregularities may be used. Such irregularities may be formed by a pressure-molding process or an etching process. By using such a plate member, it is possible to integrally form the collectors 3, 9 on the cathode lead board 4 and the anode lead board 10, respectively.

In FIG. 2-2, a restrictor 18 is formed on the cathode lead board 4 (the anode lead board 10) so as to surround the cathode 1 (anode 7). The restrictor 18 serves as a reinforcing body. An insulating material or a conducting material can be used as a constituent material of the restrictor 18.

In the terminal electrodes shown in FIG. 2-1 and FIG. 2-2, constituent materials used thereto may be identical or may be different from the constituent materials of the cathode 1 and the anode 7.

According to the present invention, the electrolyte 13 may be filled into the spacing provided between the cathode 1 and the anode 7 so as to cover at least one of the cathode 1 and the anode 7.

According to the present invention, the electrolyte 13 is filled into the spacing by pressure-molding solid electrolyte powder (solid electrolyte particles or solid electrolyte materials of the present invention).

An average particle size of the solid electrolyte particles (material) is not particularly limited but is preferably in the range of about 1 to 20 µm and more preferably in the range of about 1 to 10 µm. Use of the solid electrolyte particles having such an average particle size makes it possible to improve the mutual contact of the solid electrolyte particles in the electrolyte 13, and also to increase the bonding area between the electrode active material (particles of the electrode active material) and the solid electrolyte particles in the electrodes.

Consequently, it becomes possible to sufficiently secure transfer paths of the lithium ion, thereby further improving the characteristics of the battery device 100 and a secondary battery of a laminate type produced by using the battery device 100.

Moreover, a distance between the terminal electrodes, namely an average thickness of the electrolyte 13 filled into the spacing is preferably in the range of about 10 to 500 µm and more preferably in the range of about 30 to 300 µm.

According to the present embodiment described above, the battery device 100 is constituted in a state that the electrolyte 13 covers both the cathode 1 and the anode 7. This makes it possible to prevent a peripheral end portion of the electrolyte 13 from being contaminated by the electrode active material and the conductive material separated from the electrodes which are formed by using the electrode mixture material obtained by mixing the electrode active material and the conductive material such as carbon. That is, it is possible to completely eliminate a phenomenon that short-circuit occurs between electrodes (the cathode 1 and the anode 7).

In general, in the case where the thickness of the electrolyte 13 included in the battery device 100 is made to be small, short-circuit is likely to occur between the electrodes by the electrode active material separated from the electrodes. As a result, in the battery of the laminate type formed from a plurality of thin electrodes and electrolyte, if only a defective electrode is included in such a battery of the laminate type, the battery can not exhibit its performance appropriately.

However, according to the battery device 100 of the present invention, since both the cathode 1 and the anode 7 are covered with the electrolyte 13, no short-circuit occurs in the battery device 100. In this way, the battery device 100 of the present invention exhibits superior effects as described above.

The surfaces of the cathode lead board 4 and the anode lead board 10 used in the present embodiment, namely the surfaces thereof in contact with the cathode 1 and the anode 7 may be formed with irregularities. By using such a cathode lead board 4 and an anode lead board 10, the irregular surfaces of the cathode lead board 4 and the anode lead board 10 can exhibit a function of the collector 3 and the collector 9, respectively. This makes it possible to obtain an advantage in that use of mesh members as the collectors 3 and 9 contained in the cathode 1 and the anode 7 can be omitted, respectively.

The irregular surfaces have concave portions and convex portions. The cross-section shape of the concave portions and the convex portions in such irregular surfaces is not limited particularly but may be: circular; ellipse; triangle; quadrangle such as rectangle, square and rhombus; polygon such as pentagon, hexagon and octagon; amorphous; or the like.

Further, two or more of the concave portions and the convex portions of which cross-section shapes are different from each other may be existed on the irregular surfaces of the cathode lead board 4 and the anode lead board 10.

A occupation percentage of an area of the concave portions in each of the irregular surfaces of the cathode lead board 4 and the anode lead board 10 is preferably in the range of about 25 to 90% and more preferably in the range of about 50 to 85% in a plan view.

Further, an average height of the convex portions is preferably in the range of about 50 to 400 μm and more preferably in the range of about 100 to 200 μm.

By setting the occupation percentage of the area of the concave portions and the average height of the convex portions within the above noted ranges, it is possible to reliably exhibit a function of a collector by the concave portions and the convex portions.

In order to discharge and charge the battery device 100, the cathode lead board 4 and the anode lead board 10 are connected to a cathode end terminal 6 and an anode end terminal 12 through the cathode connection lead 5 and the anode connection lead 11, respectively. In the battery device 100, the cathode connection lead 5 and the anode connection lead 11 are configured so that they pass through the fixed portion 14.

As shown in FIG. 1, since the battery device 100 is covered by the fixed portion 14 in the battery container 15, the fixed portion 14 is in contact with the peripheral end portion of the electrolyte 13 filled into the spacing. Further, as shown in FIG. 2-2, the restrictors 18 are formed on the cathode lead board 4 and the anode lead board 10 so as to surround the cathode 1 and the anode 7. Therefore, the restrictors 18 are also in contact with the electrolyte 13. In FIG. 1, portions 18' in which the side surfaces of the cathode 1 and the anode 7 are in contact with the electrolyte 13 serve as the restrictor 18.

The restrictor 18 and the portions 18' have a function of restricting (suppressing) expansion and contraction in a plane direction during the discharge and charge of the all-solid lithium-ion secondary battery 200 including the battery device 100. That is to say, the restrictor 18 and the portions 18' have a function of restricting the expansion of the electrodes (cathode 1 and anode 7) in a plane direction (which is a direction perpendicular to a direction from the cathode 1 to the anode 7).

Further, the restrictor 18 and the portions 18' also have a function of restricting expansion of a portion of the electrolyte 13 provided between the cathode 1 and anode 7 in the plane direction, which occurs in accordance with the expansion of the electrodes. As a result, the restrictor 18 and the portions 18' can suppress disconnection or breakage of an electronic bond between the electrolyte 13 and the electrodes 1 and 7.

Generally, in the battery device 100, a crystal structure of the electrode active material is three-dimensionally deformed (expanded or contracted) in response to the charge-discharge operations.

Therefore, in a conventional all-solid lithium secondary battery in which no restrictor is formed on a cathode lead board and a anode lead board and in a conventional all-solid lithium secondary battery in which a sulfide-based lithium-ion conductor is used as a solid electrolyte material, a crystal structure of an electrode active material is three-dimensionally deformed (changed) during the charge-discharge operations of the conventional all-solid lithium secondary battery. Therefore, a cathode and an anode thereof are significantly deformed (expanded or contracted) not only in a thickness direction thereof but also in a plane direction thereof.

As a result, an electrolyte layer provided between the cathode and the anode is also expanded (or is contracted during the reverse reaction) in the plane direction. At that time, peripheral end portions of the cathode and the anode on which no electrolyte layer is provided are produced. This induces the deformation of the electrolyte layer in the plane direction.

In such peripheral end portions, since an electronic bond or an ion-conducting path between the electrolyte layer and the electrodes (electrode active material) is disconnected due to the deformation of the electrolyte layer, it becomes difficult for an current to flow between the electrodes in accordance with the repeated charge and discharge operations. As a result, in the peripheral end portions, separation between the electrodes (electrode active material) and the electrolyte layer occurs.

This phenomenon proceeds gradually as the conventional all-solid lithium-ion secondary battery is repeatedly charged and discharged. As a consequence, a battery capacity of the conventional all-solid lithium-ion secondary battery is gradually reduced, which makes it difficult to charge and discharge the conventional all-solid lithium-ion secondary battery.

In contrast, the battery device 100 of the present invention is configured to have the restrictor 8 that serves to restrict expansion of the cathode 1 and the anode 7 (electrode) in the plane direction thereof (the vertical direction in FIG. 1) and the resultant expansion of the electrolyte 13 in a plane direction thereof. Thus, the battery device 100 can be kept in a shape as close to the initial shape as possible when manufacturing the all-solid lithium-ion secondary battery 200 and charging and discharging the same.

That is to say, the afore-mentioned problem in the conventional all-solid lithium-ion secondary battery can be avoided by restricting expansion of the cathode (electrode) 1 and the electrolyte 13 in the plane direction thereof. As a result, it becomes possible to avoid battery capacity reduction which would otherwise occur over the lapse of charge-discharge cycles (by the multiple times of charge-discharge operations).

The constituent material of the restrictor 18 is not particularly limited, but preferably it is made of an insulating material, an electrical conductive material and an inactive material which does not affect a battery reaction. This makes it possible to reliably prevent occurrence of short-circuit between the cathode 1 and the anode 7.

Examples of the insulating material include: various kinds of resin materials such as a thermoplastic resin, a thermosetting resin and a photocurable resin; various kinds of glass materials such as low-melting-point glass; various kinds of ceramics materials; and the like.

Among these materials, it is preferable that the insulating material is any one of the thermoplastic resin, the thermosetting resin, the photocurable resin and the low-melting-point glass or a combination of two or more of them. Use of these materials allows the restrictor 18 to be formed with ease. Furthermore, use of these materials makes it possible to increase mechanical strength of the restrictor 8.

Examples of the thermoplastic resin include polyolefin, an ethylene-vinyl acetate copolymer, polyamide, polyimide and a hot-melt resin. Examples of the thermosetting resin include an epoxy-based resin, a polyurethane-based resin and a phenol-based resin.

Further, examples of the photocurable resin include an epoxy-based resin, an urethane acrylate-based resin and a vinyl ether-based resin.

Examples of the low-melting-point glass include a $P_2O_5$—$CuO$—$ZnO$-based low-melting-point glass, a $P_2O_5$—$SnO$-based low-melting-point glass and a $B_2O_3$—$ZnO$—$Bi_2O_3$—$Al_2O_3$-based low-melting-point glass.

An average thickness of the restrictor 18 (particularly, the average thickness of a side surface thereof) is preferably in the range of about 30 to 500 μm and more preferably in the range of about 50 to 300 μm, although it may be slightly changed depending on a constituent material and intended use of the restrictor 18.

By setting the average thickness within the above noted range, it is possible to reliably prevent expansion of the cathode (electrode) 1 and the electrolyte 13 in the plane direction thereof, thereby allowing the restrictor 18 to play its role in a reliable manner.

Production of the conventional battery device (all-solid lithium-ion secondary battery) using the materials as described above is carried out as follows.

Figure 3:
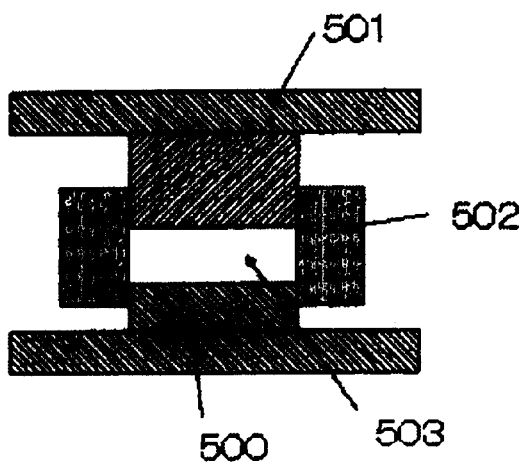
FIG. 3 is a vertical section view which shows a mold for producing a battery device.
Figure 4:
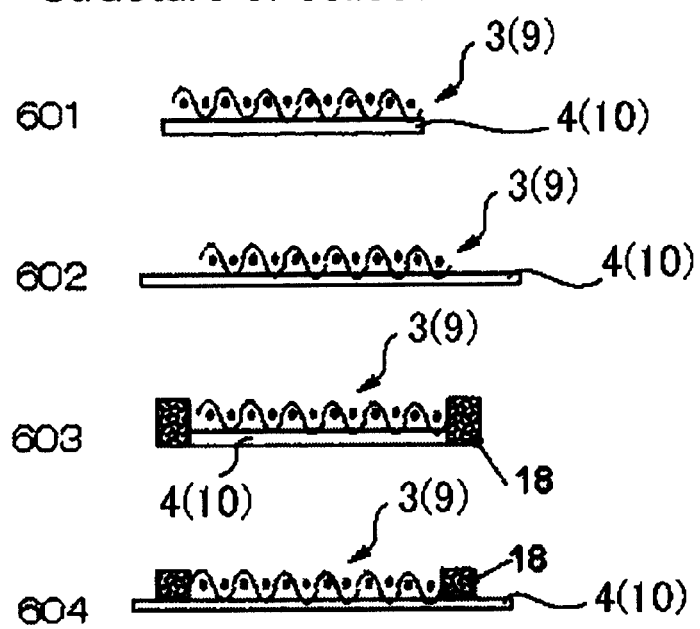
FIG. 4 is a vertical section view which shows structures of various collectors with lead boards that can be used for producing an all-solid lithium secondary battery.

For example, a battery device is produced by using a mold as shown in FIG. 3. In a state that a lower male mold 500 is inserted into a cylindrical hole 503 of a female mold 502, a collector with a lead board 601 as shown in FIG. 4 is set so that the lead board thereof is in contact with the lower male mold 500.

Then, an electrode mixture material (cathode mixture material) is filled in the cylindrical hole 503 to obtain a layer of the electrode mixture material. After the surface of the layer is flatted, an upper male mold 501 is inserted into the cylindrical hole 503. By preliminarily pressure-molding the layer, an electrode (e.g. cathode) is preliminarily formed.

Next, the upper male mold 501 is removed from the cylindrical hole 503 of the female mold 502, and then an electrolyte material is filled into the cylindrical hole 503 to obtain a layer of electrolyte material (electrolyte layer). After the surface of the layer is flatted, the upper male mold 501 is again inserted in the cylindrical hole 503. Thereafter, the layer of the electrolyte material is pressed preliminarily.

By doing so, the cathode and the electrolyte are joined preliminarily. Next, the upper male mold 501 is again removed from the cylindrical hole 503 of the female mold 502, and then an electrode mixture material (anode mixture material) is filled on the electrolyte pressed in the cylindrical hole 503 to obtain a layer of the electrode mixture material.

After the surface of the layer is flatted, the upper male mold 501 is again inserted in the cylindrical hole 503. Thereafter, the layer of the electrode mixture material is pressed preliminarily. Then, the upper male mold 501 is again removed from the cylindrical hole 503 of the female mold 502, a collector with a lead board 601 as shown in FIG. 4 is set so that the lead board thereof is placed in the upper side in FIG. 3.

Thereafter, the upper male mold 501 is again inserted in the cylindrical hole 503, and then the materials and the collectors with the lead boards preliminarily joined in the cylindrical hole 503 are pressure-molded at a pressure being capable of joining the entirety thereof to obtain a molded body.

Figure 5:
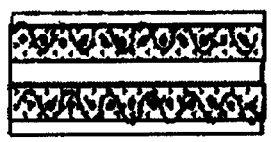
FIG. 5 is a vertical section view which shows a battery device included an all-solid lithium secondary battery of a conventional type.

The thus obtained molded body is removed from the cylindrical hole 503 of the female mold 502 to thereby obtain a conventional battery device. A structure of the conventional battery device is shown in FIG. 5. When the conventional battery device is removed from the cylindrical hole 503 of the female mold 502, the side surface of the electrolyte layer included in the conventional battery device is contaminated by a cathode active material and an anode active material, thereby the many short-circuits occur between the cathode and the anode.

Figure 6:
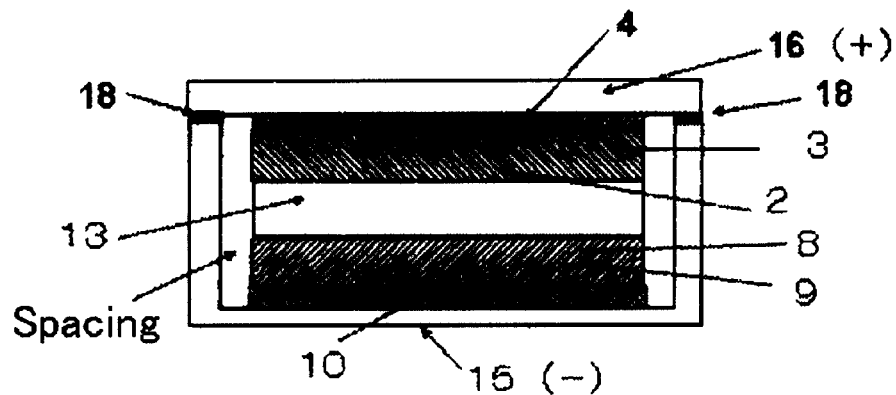
FIG. 6 is a vertical section view which shows an all-solid lithium secondary battery of a conventional type.

The thus obtained conventional battery device is placed into a battery container 15 (which serves an anode in the conventional battery device) so as to be a configuration as shown in FIG. 6 to obtain the conventional all-solid lithium-ion secondary battery. In this regard, a container obtained by subjecting entire surfaces of a stainless container or an iron container to a nickel plating treatment is used as such a battery container 15.

In many cases the thus obtained conventional battery device is placed into a coin-type container. The same material as the material used in the battery container 15 is used as an upper lid 16 (which serves a cathode in the conventional battery device) of the battery container 15. The battery container 15 is sealed with the upper lid 16 in a state that they are insulated by an insulating resin or a packing.

In contrast, production of the battery device 100 of the present invention is carried out as follows.

Figure 7:
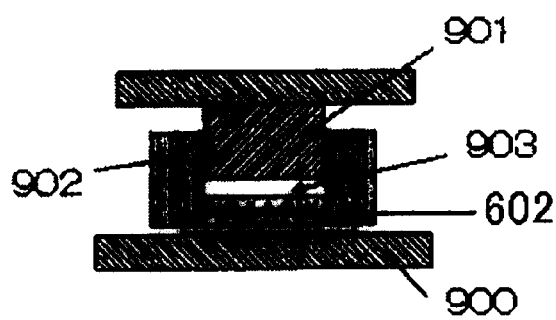
FIG. 7 is a vertical section view which shows a mold that can be used for producing electrodes of an all-solid lithium secondary battery in accordance with the present invention.

First, in a mold (which has a metal plate 900, an upper male mold 901 and a female mold 902) shown in FIG. 7, a collector with a lead board 602, 603 or 604 shown in FIG. 4 is set on the metal plate 900 so that the lead board thereof is in contact with the metal plate 900. In a state that the female mold 902 is set on the lead board so as to surround the collector, an electrode mixture material (cathode mixture material) is filled in a cylindrical hole 903 of the female mold 902 to obtain a layer of the cathode mixture material.

After the layer is flatted, the layer is pressure-molded preliminarily to obtain the electrode (cathode 1). The thus obtained cathode with the lead board is removed from the mold to prepare a terminal electrode (cathode 1) with the lead board for used in the all-solid lithium secondary battery 200 of the present invention. In this regard, it is to be noted that a terminal electrode (anode 7) with a lead board is also produced in the same manner.

The battery device 100 using the thus obtained the terminal electrodes is produced by the following molding steps. First, a solid electrolyte material is molded by using a mold (which has a lower male mold 1000, an upper male mold 1001, a female mold 1002 and an upper male mold 1004) shown in FIG. 8 to obtain an electrolyte 13. Thereafter, the battery device 100 is produced as follows.

Figure 9:
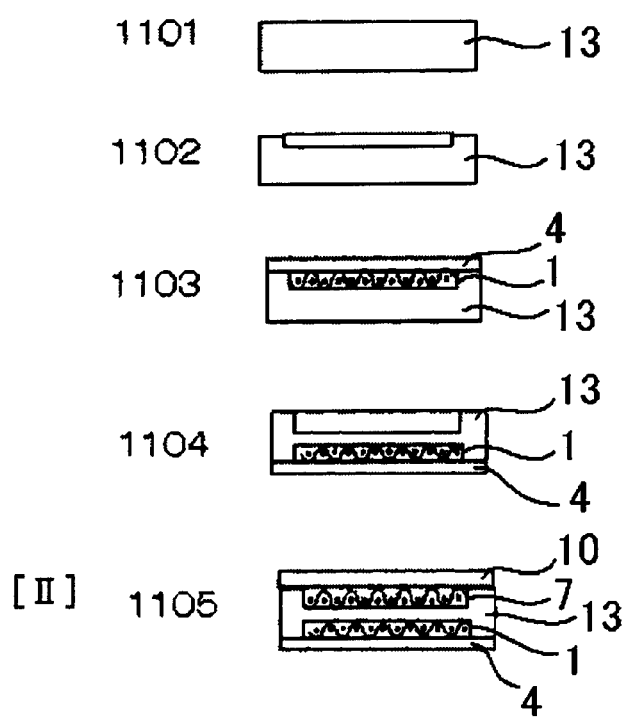
FIG. 9 is a flowchart illustrating a method of producing a battery device in accordance with the present invention.

That is to say, (I) a solid electrolyte material is filled into a cylindrical hole 1003 of the female mold 1002 in a state that the lower male mold 1000 is inserted into the cylindrical hole 1003 of the female mold 1002 to obtain a layer of an electrolyte 13. Then, the surface of the layer of the electrolyte 13 is flatted (in this state, the layer of the electrolyte 13 is shown by the step 1101 in FIG. 9).

(II) Thereafter, the upper male mold 1004 having a convex portion 1006 for forming a space portion (concave portion) capable of receiving an electrode is inserted into the cylindrical hole 1003 of the female mold 1002. Then, the layer of the electrolyte 13 is pressed at weak power by the upper mold 1004 to form a concave portion (in this state, the layer of the electrolyte 13 is shown by the step 1102 in FIG. 9).

(III) The upper male mold 1004 is removed from the cylindrical hole 1003 of the female mold 1002, and then the terminal electrode (cathode 1) with the lead board produced as described above is set into the concave portion so that the cathode active material contained in the cathode 1 is in contact with the electrolyte 13. Thereafter, the cathode 1 with the lead board is preliminarily pressure-molded by the upper male mold 1001 (in this state, the cathode 1 is joined with the electrolyte 13 in the concave portion, which is shown by the step 1103 in FIG. 9). Next, in this state, the mold is turned over, and then the lower male mold 1000 is removed from the cylindrical hole 1003 of the female mold 1002.

(IV) Another upper male mold 1004 is inserted into the cylindrical hole 1003 of the female mold 1002. Then, a concave portion for receiving an electrode is formed on the other surface of the layer of the electrolyte 13 in the same manner as the above item (II) (in this state, the layer of the electrolyte 13 is shown by the step 1104 in FIG. 9).

(V) The terminal electrode (anode 7) with the lead board produced as described above is set into the concave portion so that the anode active material contained in the anode 7 is in contact with the electrolyte 13. The anode 7 with the lead board is preliminarily pressure-molded by the lower male mold 1000 to obtain a battery device 100 (in this state, the anode 7 is joined with the electrolyte 13 in the concave portion, which is shown by the step 1105 in FIG. 9).

(VI) The thus obtained battery device 100 is removed from the mold. In this way, the battery device 100 of the present invention is produced (in this state, the battery device 100 is shown by the step 1105 in FIG. 9).

In the molding steps described above, a pressure for pressure-molding is preferably 2 ton/cm$^2$ or larger, more preferably 3 ton/cm$^2$ or larger, and even more preferably 5 ton/cm$^2$ or larger. This makes it possible to reliably press the electrode mixture materials. Further, it is possible to reliably fill the electrode mixture material into through-holes provided in the collector 3 (collectors with the lead boards 601 to 604 shown in FIG. 4). A constituent material of the various molds used for producing the battery device 100 is not limited to metal but may be resin or ceramics.

Figure 10:
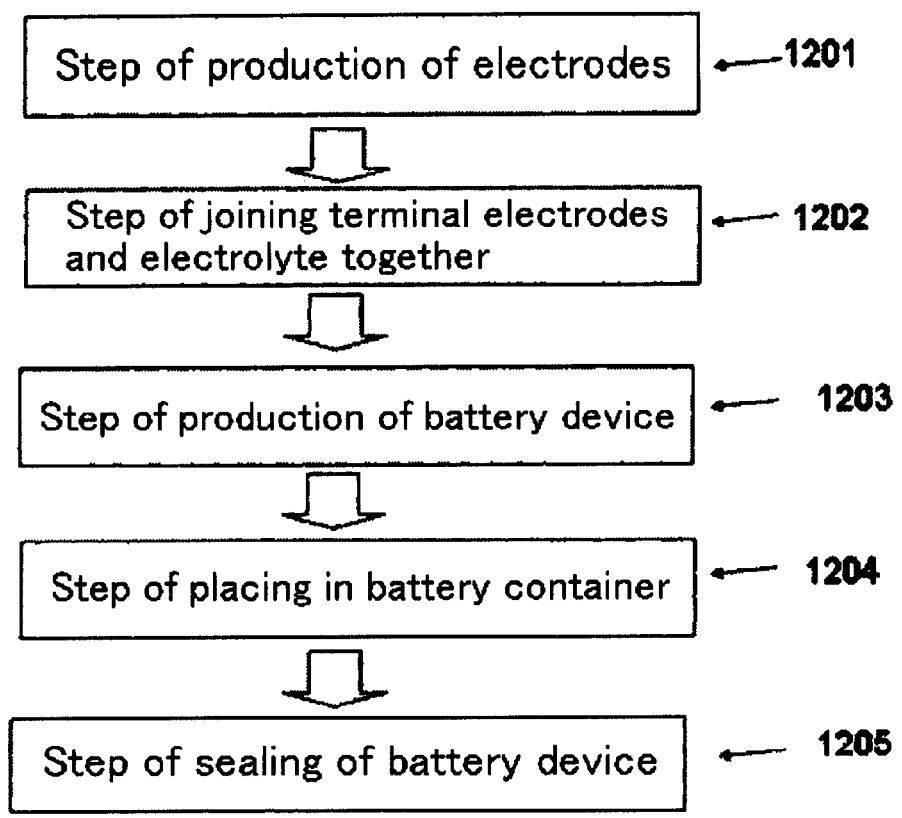
FIG. 10 is a flowchart illustrating a method of producing an all-solid lithium-ion secondary battery in accordance with the present invention.

Next, a method of producing a battery device 100 and an all-solid lithium-ion secondary battery 200 according to the present invention will be described one by one by using a flow chart shown in FIG. 10.

A Step of Production of Electrodes (1201)

First, two collectors with lead boards shown in FIG. 4 which are needed to produce electrodes (cathode and anode) are prepared. That is, two electrodes of the two collectors with lead boards are used in terminal electrodes.

I Step of Production of Terminal Electrodes

In a mold shown in FIG. 7, either a collector with a lead board 602, 603 or 604 shown in FIG. 4 is placed on the surface of a metal plate 900 so that the lead board thereof is in contact with the surface of the metal plate 900. In a state that a female mold 902 is set on the lead board so as to surround the collector thereof, an electrode mixture material (cathode mixture material) is filled into a cylindrical hole 903 of the female mold 902 to obtain a layer of the cathode mixture material.

After the layer is flatted by using an upper male mold 901, the layer is preliminarily pressing-molded to obtain an electrode (cathode 1). The thus obtained cathode 1 with the lead board (cathode lead board 4) is removed from the mold to obtain a terminal electrode (cathode 1) with the cathode lead board 4 for use in the all-solid lithium-ion secondary battery 200 of the present invention. In this regard, it is to be noted that another terminal electrode (anode 7) with lead board is obtained in the same manner as described above. These terminal electrodes are shown in FIG. 2-1.

B Step of Joining Terminal Electrodes and Electrolyte together (1202)

Figure 8:
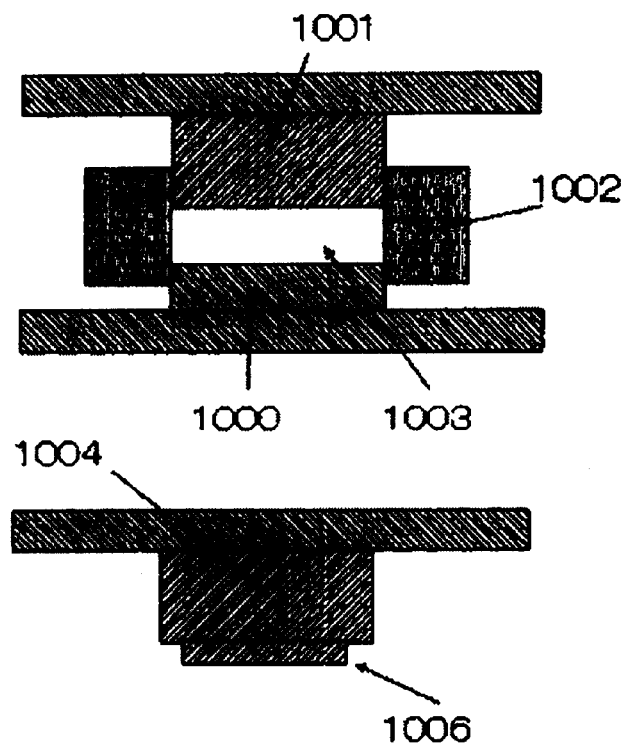
FIG. 8 is a vertical section view which shows a mold that can be used for producing a battery device in accordance with the present invention.

Next, a female mold 1002 shown in FIG. 8 of which inner diameter is larger than an inner diameter of the cylindrical hole 503 of the female mold 502 used in production of the conventional battery device as described above is prepared as a mold for producing an electrolyte 13.

A solid electrolyte material of the present invention is filled into the cylindrical hole 1003 of the female mold 1002 in a state that a lower male mold 1000 is inserted into a cylindrical hole 1003.

Next, an upper male mold 1004 provided with a convex portion 1006 of forming a space (concave) portion for inserting an electrode is inserted into the cylindrical hole 1003 of the female mold 1002. Then, the solid electrolyte material is preliminarily pressing-molded by the upper male mold 1004 to obtain a layer of an electrolyte 13 having the concave portion which is capable of receiving an electrode.

Thereafter, the upper male mold 1004 is removed from the cylindrical hole 1003 of the female mold 1002, and then the terminal electrode (cathode 1) of the terminal electrode with the lead board produced in the A step is inserted (set) into the concave portion. Then, an upper male mold 1001 having no convex portion is inserted into the cylindrical hole 1003 of the female mold 1002.

Thereafter, the cathode 1 with the lead board (cathode lead board 4) is preliminarily pressure-molded by the upper male mold 1001 to join the cathode 1 and the electrolyte 13 together in the concave portion. As a result, the cathode 1 is covered by the electrolyte 13 (shown by the step 1104 in FIG. 9).

In this regard, it is to be noted that the terminal electrode (anode) is also joined with the electrolyte 13 in the concave portion in the same manner as described above.

C Step of Production of Battery Device (1203)

Next, in a state that a molded body in which the cathode 1 is joined with the electrolyte 13 is not removed from the mold, the mold (FIG. 8) is turned over. In other words, in a state that the upper male mold 1001 and the lower male mold 1000 are inserted into the cylindrical hole 1003 of the female mold 1002, the mold shown in FIG. 8 is turned over.

Thereafter, the lower male mold 1000 turned over in the upper side of FIG. 8 is removed from the cylindrical hole 1003, and then the upper male mold 1004 with a convex portion 1006 of forming a space (concave) portion for inserting an terminal electrode is inserted in the cylindrical hole 1003 of the female mold 1002 so as to be in contact with the surface of the electrolyte 13. Then, the electrolyte 13 is preliminarily pressure-molded by the upper male mold 1004 to obtain the concave portion which is capable of receiving the terminal electrode (anode).

Thereafter, the upper male mold 1004 is removed from the cylindrical hole 1003 of the female mold 1002, and then the terminal electrode of the terminal electrode with the lead board produced in the A step is inserted (set) into the concave portion. Then, the upper male mold 1001 having no convex portion is again inserted into the cylindrical hole 1003.

Thereafter, the terminal electrode (anode 7) with the lead board (anode lead board 10) is pressure-molded at a predetermined pressure to produce a battery device 100 of which cathode 1 and anode 7 are covered by the electrolyte 13. The battery device 100 is shown by the step 1105 in FIG. 9.

In the A to C steps, a pressure to pressure-mold the materials, the electrolyte 13, the collectors with the lead boards (molded body) is preferably 2 ton/cm$^2$ or larger, more preferably 3 ton/cm$^2$ or larger, and even more preferably 5 ton/cm$^2$ or larger. This makes it possible to sufficiently press the molded body and cover the cathode 1 and the anode 7 with the electrolyte 13 in the battery device 100. Therefore, it is possible to reliably join the cathode 1 or the anode 7 and the electrolyte 13 together.

As a result, it is possible to reliably prevent occurrence of short-circuit between the cathode 1 and the anode 7 in the produced battery device 100, thereby producing the battery device 100 having constant battery-performance.

If needed, a mold release agent may be in advance applied to the inner surfaces of the cylindrical holes 903 and 1003 of the female molds 902 and 1002 used in the A to C steps. The mold release agent is used for improving release property of the produced battery device 100.

D Step of Placing Battery device in Battery Container (1204)

This step will be described by using the battery device 100 shown in FIG. 1. The cathode lead board 4 and the anode lead board 10 of the battery device 100 obtained in the C step are connected with the electrode end terminal 6 and the electrode end terminal 12 provided on the upper lid 16, respectively, through the cathode connection lead 5 and the anode connection lead 11 each having conductive property.

Figure 11:
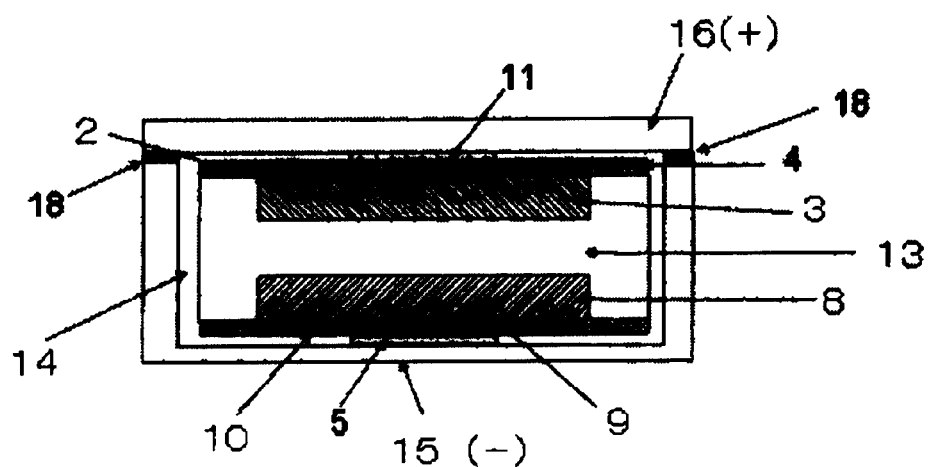
FIG. 11 is a vertical section view which shows an all-solid lithium secondary battery in accordance with the present invention.

Next, an insulating material constituting the fixed portion 14 is preliminarily filled into the battery container 15. Thereafter, the battery device 100 in which the cathode lead board 4 and the anode lead board 10 are connected with the cathode end terminal 6 and the anode end terminal 12, respectively through the cathode connection lead 5 and the anode connection lead 11 is placed into the battery container 15. This is shown in FIG. 11.

In the case where the fixed portion 14 is made of, e.g., hot-melt resin (a hot-melt adhesive agent) or a low-melting-point glass, it is possible to form the fixed portion 14 by melting or softening the hot-melt resin or the low-melting-point glass, supplying the battery device 100 in the battery container 15 and allowing the same to be cooled down and solidified. This method ensures that the fixed portion 14 is reliably formed so as to cover almost all of the battery device 100.

Examples of a constituent material of each of the battery container 15 and the upper lid 16 include: various kinds of metallic materials such as aluminum, copper, brass and stainless steel; various kinds of resin materials; various kinds of ceramics materials; various kinds of glass materials; various kinds of composite materials consisting of metal and resin; and the like.

The cathode active material and the anode active material are not particularly limited to the ones noted above. There is no problem if a material exhibiting electropositive potential against the anode active material is selected as the cathode active material through the combination of the afore-mentioned materials. By adopting such a configuration, it is possible to provide the all-solid lithium-ion secondary battery 200 having an arbitrary discharge voltage.

Furthermore, it is preferred that a material produced by mixing a conventional sulfide-based lithium-ion conductor (starting material) and α-alumina is used as a solid electrolyte material of the present invention.

Examples of the sulfide-based lithium-ion conductor to be used as the starting material include: a glass of conducting a lithium ion such as $Li_2S$—$SiS_2$, $Li_2S$—$SiS_2$—$LiI$, $Li_2S$—$SiS_2$—$LiBr$, $Li_2S$—$SiS_2$—$LiCl$, $Li_2S$—$SiS_2$—$B_2S_3$—$LiI$, $Li_2S$—$SiS_2$—$P_2S_5$—$LiI$, $Li_2S$—$B_2S_3$, $Li_2S$—$B_2S_3$—$LiI$, $Li_2S$—$P_2S_5$, $Li_2S$—$P_2S_5$—$LiI$, $Li_2S$—$P_2S_5$—$Z_mS_n$ (Z=Ge, Zn, Ga) (the "m" and "n" represent=integers except 0), $Li_2S$—$GeS_2$, $Li_2S$—$SiS_2$—$Li_3PO_4$; a crystalline material of conducting a lithium ion containing these glasses; a material of conducting a lithium ion which constituted of a mixture of these glasses and crystalline material; and the like.

Furthermore, it is preferred that the sulfide-based lithium-ion conductor contains at least one of a crystalline material and an amorphous material. The lithium ion conductor constituted of the crystalline material is a material that endows the solid electrolyte material with the most superior lithium ion conductivity and exhibits good moldability. Therefore, use of the lithium-ion conductor constituted of the crystalline material in producing the secondary battery provides an advantage that the output current density can be kept high.

On the other hand, since the lithium-ion conductor constituted of the amorphous material does not give anisotropic conductivity to the material made therefrom, it is possible to maintain the ion-conducting path to the electrode active material in a good state. Further, since the lithium-ion conductor constituted of the amorphous material has high heat stability, the lithium-ion conductor constituted of the amorphous material has an advantage in that superior preservability is exhibited after producing the all-solid lithium-ion secondary battery 200.

If the lithium-ion conductors constituted of the crystalline material and the amorphous material are used in combination, it becomes possible to expect all the advantages offered by them.

Such a solid electrolyte material may contain an organic binder constituted of an organic (resin) material as a main component in addition to the sulfide-based lithium-ion conductor and α-alumina. Even if the solid electrolyte material contains the organic binder in addition to the sulfide-based lithium-ion conductor and α-alumina, the solid electrolyte material maintains the same or higher ion conductivity as that of a solid electrolyte material constituted of only the sulfide-based lithium-ion conductor. In other words, inclusion of the organic binder does not reduce ion conductivity of the solid electrolyte material.

Additionally, it is possible to improve mechanical strength of the electrodes 1, 7 and the electrolyte 13 produced by using such a solid electrolyte material containing the organic binder.

Examples of the resin material that can be used as the organic binder include: but not limited thereto, a styrene block copolymer such as a styrene-butadiene-styrene block co-polymer, a styrene-isoprene-styrene block co-polymer, a styrene-ethylene-butylene-styrene block co-polymer; polybutadien; polyolefin; polyamide; polyimide; a hot-melt resin; and the like. The resin material is preferably constituted of one or more of these materials as a main component.

This makes it possible to prevent ion conductivity of the solid electrolyte material containing the organic binder from being lowered Further, it is also possible to improve mechanical strength of the electrodes 1, 7 and the electrolyte 13 produced by using the solid electrolyte material containing the organic binder.

E Step of Sealing of Battery Device (1205)

Next, the upper lid 16 is put on the top of the battery container 15 through a packing to thereby join the upper lid 16 and the battery container 15 by a press sealing method.

Hereinbelow, description will be made with regard to experimental examples of the present invention in order to describe in detail an all-solid lithium secondary battery according to the present invention.

Example 5

An all-solid lithium secondary battery including a battery device of the present invention (FIG. 11) is produced as described above. The battery device of which electrodes are formed on lead boards so as to be covered with an electrolyte provided therebetween is produced as described above.

In this regard, lithium cobaltate is used as a cathode active material. A ternary-based sulfide-based lithium-ion conducting glass constituted of $Li_2S$, $SiS_2$, and $LiPO_4$ is used as a starting material of a solid electrolyte material. The solid electrolyte material is produced by mixing a ternary-based sulfide-based lithium-ion conducting glass and α-alumina of 5% at a ratio by weight to the ternary-based sulfide-based lithium-ion conducting glass. In this regard, lithium-ion conductivity of the solid electrolyte material is $3.5 \times 10^{-3}$ S/cm. The lithium cobaltate and the solid electrolyte material are mixed at a weight ratio of 7:3 to obtain a cathode mixture material. A cathode is produced by using the cathode mixture material. A diameter of the produced cathode is 16 mm and a thickness of the produced cathode is about 250 µm.

The solid electrolyte material is used in an electrolyte. A diameter of the electrolyte consisted of the ternary-based sulfide-based lithium-ion conducting glass filled into a spacing between the electrodes is 18 mm and a thickness of the electrolyte is about 300 µm. Indium powder (of which particle size is 5 µm) is used as an anode active material. The indium powder and the solid electrolyte material are mixed at a weight ratio of 5:5 to obtain an anode mixture material. An anode is produced by using the anode mixture material. A diameter of the anode is 16 mm and a thickness of the anode is about 150 µm.

A thickness of a mesh member constituting a collector is 100 µm. A titanium thin film having a thickness of 300 µm is used as a cathode lead board and an anode lead board. In this regard, a sum of the thicknesses of the cathode and the cathode lead board is used as the thickness of the cathode and a sum of the thicknesses of the anode and the anode lead board is used as the thickness of the anode.

An all-solid lithium-ion secondary battery (FIG. 11) is produced based on the embodiment described above so as to have the sizes of the parts described above.

In order to examine characteristics of the produced the all-solid lithium secondary battery, the produced all-solid lithium secondary battery is charged at a constant current of 500 µA/cm$^2$. When a current became 30 µA after a charge voltage reached 3.8 V, the charge is stopped. After a lapse of 30 minutes from the charge stooping time, discharge is started at the same current as that of the charge.

Comparative Example 5

In order to examine the effects of the Example 5, ten all-solid lithium secondary batteries (FIG. 6) are produced by using the ternary-based sulfide-based lithium-ion conducting glass constituted of $Li_2S$, $SiS_2$, and $LiPO_4$, which is used as a starting material for producing the solid electrolyte material in the Example 5, as a conventional sulfide-based lithium-ion conductor.

A constituent material of each part of the ten all-solid lithium secondary batteries is same as that of the Example 5 except for a constituent material of a solid electrolyte material. A cathode of which diameter is 16 mm and thickness is about 250 µm is formed on a cathode lead board.

The cathode with the cathode lead board is placed into a mold, and then the ternary-based sulfide-based lithium-ion conducting glass is filled into the mold and pressed by the mold to obtain an electrolyte layer so that a diameter of the electrolyte layer is 16 mm and a thickness of the electrolyte layer is 300 µm. On the other hand, indium powder (of which particle size is 5 µm) as an anode active material is mixed with the ternary-based sulfide-based lithium-ion conducting glass at a weight ratio of 5:5 to obtain an anode mixture material.

An anode is formed on an anode lead board by using the obtained anode mixture material and a collector so that a thickness of the anode is 150 µm. The anode with the anode lead board is set in the mold. Then, the cathode with the cathode lead board, the electrolyte layer and the anode with the anode lead boar are pressure-molded to obtain a battery device. A thickness of a mesh member of the used collector is 100 µm.

A titanium thin film having a thickness of 300 µm is used as the cathode lead board and the anode lead board. In this regard, a sum of the thicknesses of the cathode and the cathode lead board is used as the thickness of the cathode and a sum of the thicknesses of the anode and the anode lead board is used as the thickness of the anode.

Ten all-solid lithium secondary batteries shown in FIG. 6 are produced by using the thus obtained battery devices.

Example 6

An all-solid lithium secondary battery is produced in the same manner as the Example 5 except that the solid electrolyte material in the Example 5 is changed to a new crystalline material constituting the sulfide-based lithium-ion conductor ($Li_2S$—$GeS_2$—$P_2S_5$) which contains α-alumina of 5% with respect to the sulfide-based lithium-ion conductor, which is produced in the Example 2.

In order to examine characteristics of the produced all-solid lithium secondary battery, the produced all-solid lithium secondary battery is charged at a constant current of 500 µA/cm$^2$. When a current became 30 µA after a charge voltage reached 3.8 V, the charge is stopped. After a lapse of 30 minutes from the charge stooping time, discharge is started at the same current as that of the charge.

Comparative Example 6

In order to examine the effects of the Example 5, six all-solid lithium secondary batteries (FIG. 6) are produced in the same manner as the Example 5 except that the solid electrolyte material is changed to a crystalline material constituting a ternary-based sulfide-based lithium-ion conducting glass of constituted of $Li_2S$, $GeS_2$, and $P_2S_5$, which is used as a starting material for producing the solid electrolyte material in the Example 6, as a conventional sulfide-based lithium-ion conductor.

When the six all-solid lithium secondary batteries (FIG. 6) are produced, short-circuit between the cathode and the anode occurred in the five battery devices with in the six battery devices contained in the six all-solid lithium secondary batteries.

This is supposed to result from the reason that side surfaces of the cathode, electrolyte layer and anode of each defective battery device are contaminated by the cathode active material and the anode active material. Thus, the side surfaces are sanded by a sand paper to thereby remove the cathode mixture material and the anode mixture material to obtain five battery devices. Then, five all-solid lithium secondary batteries including such battery devices are produced. Thereafter, charge-discharge characteristics of the five all-solid lithium secondary batteries are evaluated in the same manner as the Example 5.

Example 7

An all-solid lithium secondary battery is produced in the same manner as the Example 5 except that the solid electrolyte material in the Example 5 is changed to a mixture of a sulfide-based lithium ion conducting glass constituted of a sulfide-based lithium ion conductor ($Li_2S$—$P_2S_5$) and α-alumina of 5% with respect to the sulfide-based lithium ion conductor, which is produced in the Example 3, and that carbon is used as the anode.

In this regard, the anode is produced by using an anode mixture material in which carbon is mixed with a solid electrolyte material at a weight ratio of 6:4 thereof.

In order to examine characteristics of the produced the all-solid lithium secondary battery, the produced all-solid lithium secondary battery is charged at a constant current of 500 μA/cm². When a current became 30 μA after a charge voltage reached 3.8 V, the charge is stopped. After a lapse of 30 minutes from the charge stooping time, discharge is started at the same current as that of the charge.

Comparative Example 7

In order to examine the effects of the Example 7, six all-solid lithium secondary batteries are produced in the same manner as the Example 7 except that the solid electrolyte is changed to a crystalline material of a ternary-based sulfide-based lithium-ion conducting glass constituted of $Li_2S$ and $P_2S_5$, which is used as a starting material for producing the solid electrolyte material in the Example 7, as a conventional sulfide-based lithium-ion conductor.

What is claimed is:

1. A solid electrolyte material comprising a sulfide-based lithium-ion conductor, α-alumina, and an organic binder constituted of a resin material as a main constituent material thereof, wherein the sulfide-based lithium-ion conductor is $Li_2S$—$GeS_2$—$P_2S_5$, $Li_2S$—$P_2S_5$, or $Li_2S$—$P_2S_5$—$LiI$, and wherein the resin material is constituted of at least one of polyamide or polyimide as a main component thereof, and wherein an amount of the α-alumina contained in the electrolyte material is 5 wt % at a ratio by weight to the sulfide-based lithium-ion conductor.

2. The solid electrolyte material as claimed in claim 1, wherein the sulfide-based lithium-ion conductor is constituted of a crystalline material, an amorphous material or a mixture material of the crystalline material and the amorphous material.

3. The solid electrolyte material as claimed in claim 1, wherein the sulfide-based lithium-ion conductor contains a semiconductor as a component thereof.

4. The solid electrolyte material as claimed in claim 1, wherein the solid electrolyte material is formed by mixing the sulfide-based lithium-ion conductor and α-alumina with a ball mill.

5. A battery device, comprising: a pair of electrodes; and an electrolyte layer provided between the pair of electrodes; wherein the solid electrolyte material defined in claim 1 is contained in the electrolyte layer.

6. An all-solid lithium secondary battery provided with the battery device defined in claim 5.

* * * * *